United States Patent

[11] 3,560,679

| [72] | Inventor | Rudi Kombuchen<br>Dusseldorf, Germany |
|---|---|---|
| [21] | Appl. No. | 836,427 |
| [22] | Filed | June 25, 1969 |
| [45] | Patented | Feb. 2, 1971 |
| [73] | Assignee | Acrow (Automation) Limited<br>London, England<br>a corporation of England |
| [32] | Priority | Aug. 31, 1968 |
| [33] | | Germany |
| [31] | | P 17 63 891.1 |

[54] SAFETY DEVICES FOR MOVABLE STORAGE UNITS
6 Claims, 3 Drawing Figs.

[52] U.S. Cl. ................................................ 200/61.44
[51] Int. Cl. ................................................ H01h 3/16

[50] Field of Search ............................................ 200/61.41,
61.42, 61.43, 50.15; 214/(Inquired); 200/61.44

[56] References Cited
UNITED STATES PATENTS
2,567,443 9/1951 O'Meara ...................... 200/61.44X
2,617,546 11/1952 Rosener ...................... 214/44

*Primary Examiner*—Robert K. Schaefer
*Assistant Examiner*—M. Ginsburg
*Attorney*—Christen & Sabol

ABSTRACT: A safety device for a movable storage unit driven by an electric motor including a safety member pivotally suspended from the movable storage unit and an actuator connected with the safety member for controlling the operation of the electric motor such that pivotal movement of the safety member deenergizes the electric motor and stops the movable storage unit.

3,560,679

SAFETY DEVICES FOR MOVABLE STORAGE UNITS

BACKGROUND OF THE INVENTION

The present invention pertains to safety devices for movable storage units and more particularly to such safety devices utilized to control the operation of electric motors driving the movable storage units.

In the past attempts have been made to provide safety devices for movable storage units to prevent injury to persons or objects in the path of the movable storage units and to prevent injury to the movable storage units and their contents. Since movable storage units are operated without a driver they will collide with anything in their paths and continue in operation even after collision. The prior safety devices have taken the form of safety bars disposed at the foot of the movable storage units directly above the surface upon which the movable storage units are being driven. If a movable storage unit is moving toward a person standing in a passageway or other dangerous position, the person can stop the movable storage unit by depressing the safety bar with his foot which breaks the circuit energizing the electric motor driving the movable storage unit.

One disadvantage of such safety devices is that the force required to depress the safety bar must be accurately applied in a horizontal plane. That is, angular forces applied to the safety bar are not effective to deenergize the electric motor, and since the force must be applied quickly, the prior safety devices have been ineffective to prevent injuries. Another disadvantage of prior safety devices is that objects in the path of a movable storage unit are not capable of stopping the storage unit due to the accurately oriented force required to depress the safety bar.

SUMMARY OF THE INVENTION

Accordingly, it is an object of the present invention to utilize an easily actuated safety device with a movable storage unit.

Another object of the present invention is to pivotally suspend a safety member on a movable storage unit such that the safety member may be moved by forces from varying directions to deenergize an electric motor driving the movable storage unit.

A further object of the present invention is to construct a safety device having a large actuating area for use with a movable storage unit.

Some of the advantages of the safety device of the present invention over prior safety devices for use with movable storage units are that actuating forces may be applied from various directions, that the force required to actuate the safety device may be adjusted and that a large target area for receiving actuating forces is provided thereby obviating the necessity of accurate force orientation.

The present invention is generally characterized in a safety device for use with a movable storage unit driven by an electric motor including a safety member suspended pivotally from the movable storage unit, and an actuator connected with the safety member and adapted to control the operation of the electric motor whereby pivotal movement of the safety member moves the actuator to deenergize the electric motor and stop the movable storage unit.

Further objects and advantages of the present invention will become apparent from the description of the preferred embodiment as shown in the accompanying drawings.

DESCRIPTION OF THE PREFERRED EMBODIMENT

Figure 1:
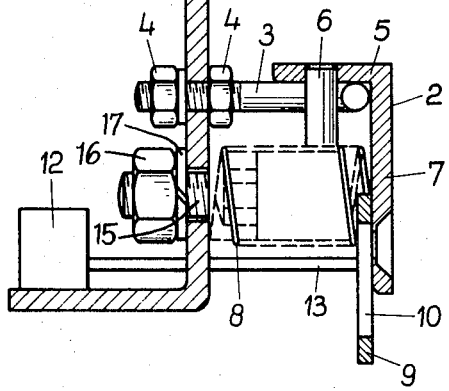
FIG. 1 is a partial side elevation in partial section of a movable storage unit utilizing the safety device of the present invention.

A safety device according to the present invention is illustrated in FIG. 1 and includes a safety member, generally indicated at 2, supported on a wall 1 of a movable storage unit by one or more eye bolts 3 secured to the movable storage unit by means of lock nuts 4.

Safety member 2 has a substantially horizontal arm 5 and a substantially vertical arm 7. Arm 5 has one or more apertures therein in which are welded cylindrical pins 6. Pins 6 are inserted in the substantially circular eyes or openings of eye bolts 3 in a loose fit such that pins 6 can tilt in the openings to permit pivotal movement of safety member 2. The horizontal position of the openings in eye bolts 3 and the secure mounting of eye bolts 3 on the movable storage unit provide a sturdy seat for arm 5 of safety member 2.

Resilient means, such as a spring 8, is mounted in compression between arm 7 and wall 1 of the movable storage unit in order to bias arm 7 away from the movable storage unit and establish a neutral position for the safety member 2, as illustrated in FIG. 1. One end of the spring 8 is attached to a threaded stud 15 which is inserted in a threaded aperture in the wall 1 and the compression of the spring can be adjusted by rotation of the stud; the position of the stud being fixed by the nut 16 and lock washer 17.

An actuator rod 13 is connected with arm 7 of safety member 2 at one end and at its other end to a switch 12 in circuit with the electric motor driving the movable storage unit.

Figure 2:
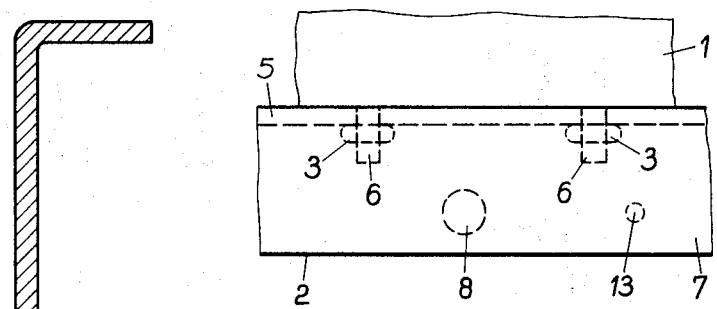
FIG. 2 is a partial front elevation of the movable storage unit and safety device of FIG. 1.

By providing a plurality of eye bolts 3 spaced horizontally from each other and a corresponding plurality of pins 6 engaging eye bolts 3, as shown in FIG. 2, the stability of safety member 2 is increased, and the pivotal action of the safety device is precisely oriented. Of course safety member 2 may run the entire width of the movable storage member and may be mounted a good distance above the foot of the movable storage unit due to the pivotal movement of safety member 2. As many safety devices as are required or desired may be connected with the movable storage unit on various sides and surfaces.

Figure 3:
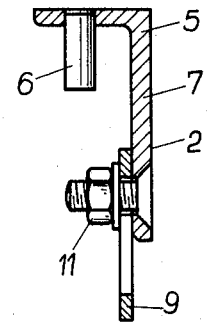
FIG. 3 is a partial side elevation of the safety device of the present invention illustrating the connection of a cover member.

An adjustably extensible cover member 9 extends below arm 7 of safety member 2 and is secured thereto by a bolt and nut arrangement 11 as illustrated in FIG. 1 and 3. Cover member 9 has one or more slots 10 for accommodating nuts 11 attached to bolts whereby cover member 9 may be vertically adjusted. It is desirable to adjust cover member 9 such that its lower edge almost touches the floor or other surface upon which the movable storage unit is being driven.

In operation the safety device may be actuated to stop the movable storage unit by applying an actuating force to the vertical arm 7 of safety member 2. The actuating force causes the safety member 2 to pivot toward the movable storage unit with eye bolts 3 acting as a fulcrum. If the actuating force is sufficient to overcome the bias of spring 8, the pivotal movement of arm 7 will move actuator rod 13 into the movable storage unit to open switch 12 and thereby open the circuit for the electric motor. The actuating force may be easily provided by a person physically by utilizing his foot to contact arm 7 or cover member 9. Similarly, due to the large target area for receiving actuating forces, stationary objects may cause pivotal action of safety member 2 to deenergize the electric motor.

The actuating force required to deenergize the electric motor may be adjusted by adjusting the compression of spring 8. By loosening nut 11, cover member 9 may be adjusted to enlarge the target area for receiving actuating forces or to lessen the target area. It is normally desirable to place cover member 9 at the level of the surface upon which the movable storage unit is being driven so as to provide maximum target area for applying actuating forces and further to detect foreign objects on the surface.

It is noted that the support structure for the safety device of the present invention permits the pivotally suspended safety member to assume a precisely determined rest or neutral position, whereby the switch may be controlled with only a slight pivotal or tipping movement of the safety member. The angular shape of the preferred embodiment is particularly effective. The horizontal leg provides a stable support for the safety member and eliminates the need for expensive hinge mountings by utilizing the pins to provide pivotal movement.

In as much as the present invention is subject to many variations, modifications and changes in detail, it is intended that all matter described in the foregoing specification or shown in the accompanying drawings shall be interpreted as illustrative and not in a limiting sense.

I claim:

1. A safety device for use with horizontally movable storage units driven by electric motor means, comprising electric switch means to be connected in a circuit for supplying energy for the electric motor means, said switch means including actuator means movable horizontally in one direction to open said circuit, resilient means urging said actuator means in the opposite direction in any position thereof, said actuator means including a safety member having a vertically extending plate, and means for loosely suspending said safety member on a storage unit for swinging movement about an upper margin of said safety member and to position the lower margin of said safety member spaced adjacent the surface upon which the unit is movable.

2. The safety device defined in claim 1, wherein said safety member includes a horizontal plate, said means for loosely suspending said safety member includes an eye bolt having a head attached to the storage unit to dispose said head under said horizontal plate and a pin attached to said plate projecting downwardly through the head of the bolt.

3. The safety device defined in claim 2 wherein said safety member includes a downwardly projecting lower marginal flat extension attached to the vertically extending plate for vertical adjustment.

4. The safety device defined in claim 2 wherein said switch means includes an electric switch, said actuator means includes a horizontal rod, one end of said rod being in contact with said plate below said eye bolt, the other end of said rod being operatively connected with said electric switch.

5. The safety device defined in claim 2, wherein said resilient means comprises coil spring means extending between the vertical wall of said unit and said vertically extending plate positioned below said eye bolt.

6. The safety device defined in claim 5, wherein said storage unit includes a wall and a threaded aperture, said coil spring means includes a threaded stud mounted in said threaded aperture in said wall for adjusting the compression.